United States Patent
Bunker et al.

(10) Patent No.: US 7,186,084 B2
(45) Date of Patent: Mar. 6, 2007

(54) HOT GAS PATH COMPONENT WITH MESH AND DIMPLED COOLING

(75) Inventors: Ronald Scott Bunker, Niskayuna, NY (US); Jeremy Clyde Bailey, Middle Grove, NY (US); Ching-Pang Lee, Cincinnati, OH (US)

(73) Assignee: General Electric Company, Niskayuna, NY (US)

(*) Notice: Subject to any disclaimer, the term of this patent is extended or adjusted under 35 U.S.C. 154(b) by 231 days.

(21) Appl. No.: 10/720,045

(22) Filed: Nov. 19, 2003

(65) Prior Publication Data
US 2005/0106021 A1 May 19, 2005

(51) Int. Cl.
*F01D 5/18* (2006.01)
(52) U.S. Cl. ............... 416/96 R; 416/241 R
(58) Field of Classification Search ............ 416/96 R, 416/97 R, 241 R
See application file for complete search history.

(56) References Cited

U.S. PATENT DOCUMENTS

| | | | |
|---|---|---|---|
| 1,848,375 A | 3/1932 | Muir | |
| 2,938,333 A | 5/1960 | Wetzler | |
| 3,229,763 A | 1/1966 | Rosenblad | |
| 3,616,125 A * | 10/1971 | Bowling | 416/229 A |
| 3,664,928 A | 5/1972 | Roberts | |
| 3,899,882 A | 8/1975 | Parker | |
| 4,158,949 A | 6/1979 | Reider | |
| 4,184,326 A | 1/1980 | Pane, Jr. et al. | |
| 4,690,211 A | 9/1987 | Kuwahara et al. | |
| 4,838,031 A | 6/1989 | Cramer | |
| 5,353,865 A | 10/1994 | Adiutori et al. | |
| 5,361,828 A | 11/1994 | Lee et al. | |
| 5,370,499 A | 12/1994 | Lee | |
| 5,402,464 A | 3/1995 | Schenk et al. | |
| 5,421,158 A | 6/1995 | Stenger et al. | |
| 5,460,002 A | 10/1995 | Correa | |
| 5,577,555 A | 11/1996 | Hisajima et al. | |
| 5,651,662 A | 7/1997 | Lee et al. | |
| 5,660,525 A | 8/1997 | Lee et al. | |
| 5,681,144 A | 10/1997 | Spring et al. | |

(Continued)

FOREIGN PATENT DOCUMENTS

EP 1111190 6/2001

(Continued)

OTHER PUBLICATIONS

U.S. Appl. No. 10/462,755, filed Jun. 6, 2002, Bunker et al.

(Continued)

*Primary Examiner*—Ninh H. Nguyen
(74) *Attorney, Agent, or Firm*—Penny A. Clarke; Patrick K. Patnode

(57) ABSTRACT

A component includes at least one wall having an inner portion and an outer portion. A number of pins extend between the inner and outer portions of the wall. The pins define a mesh cooling arrangement having a number of flow channels. A number of dimples are located in at least one of the inner and outer portions of the wall. The component may also include a number of turbulators disposed on at least one of the inner and outer portions of the wall.

30 Claims, 9 Drawing Sheets

U.S. PATENT DOCUMENTS

| | | | |
|---|---|---|---|
| 5,690,472 | A | 11/1997 | Lee |
| 5,695,321 | A | 12/1997 | Kercher |
| 5,724,816 | A | 3/1998 | Ritter et al. |
| 5,738,493 | A | 4/1998 | Lee et al. |
| 5,758,503 | A | 6/1998 | DuBell et al. |
| 5,797,726 | A | 8/1998 | Lee |
| 5,822,853 | A | 10/1998 | Ritter et al. |
| 5,933,699 | A | 8/1999 | Ritter et al. |
| 5,975,850 | A | 11/1999 | Abuaf et al. |
| 6,098,397 | A | 8/2000 | Glezer et al. |
| 6,134,877 | A | 10/2000 | Alkabie |
| 6,190,120 | B1 | 2/2001 | Thatcher et al. |
| 6,237,344 | B1 | 5/2001 | Lee |
| 6,334,310 | B1 | 1/2002 | Sutcu et al. |
| 6,402,470 | B1 | 6/2002 | Kvasnak et al. |
| 6,408,629 | B1 | 6/2002 | Harris et al. |
| 6,412,268 | B1 | 7/2002 | Cromer et al. |
| 6,468,669 | B1 | 10/2002 | Hasz et al. |
| 6,494,044 | B1 | 12/2002 | Bland |
| 6,504,274 | B2 | 1/2003 | Bunker et al. |
| 6,526,756 | B2 | 3/2003 | Johnson et al. |
| 6,589,600 | B1 * | 7/2003 | Hasz et al. .......... 427/264 |
| 6,607,355 | B2 | 8/2003 | Cunha et al. |
| 2003/0086785 | A1 | 5/2003 | Bunker |
| 2003/0203259 | A1 | 10/2003 | Bunker |

FOREIGN PATENT DOCUMENTS

| | | |
|---|---|---|
| JP | 280390 | 12/1986 |
| JP | 8110012 | 4/1996 |
| JP | 217994 | 8/1997 |
| JP | 164901 A | 6/2001 |

OTHER PUBLICATIONS

U.S. Appl. No. 10/065,115, filed Sep. 18, 2002, Bunker.
U.S. Appl. No. 10/064,605, filed Jul. 30, 2002, Bunker.
U.S. Appl. No. 10/065,495, filed Oct. 24, 2002, Bunker.
U.S. App. No. 10/162,756, filed Jun. 6, 2002, Bunker et al.
U.S. Appl. No. 10/065,814, filed Nov. 22, 2002, Bunker.
U.S. Appl. No. 10/301,672, filed Nov. 22, 2002, Bunker.
U.S. Appl. No. 10/065,108, filed Sep. 18, 2002, Bunker.
M. Ya Belen'kii et al., "Experimental Study of the Thermal and Hydraulic Characteristics of Heat-Transfer Surfaces Formed by Spherical Cavities," II. Polzunova Cent. Scientific Research, Translated from Teplofizika Vysokikh Temperatur, vol. 29, No. 6, 1992 Plenum Pub. Corp., pp. 928-933.

Belen-kiy et al., "Heat Transfer Augmentation Using Surfaces Formed by a System fo Spherical Cavities," ISSN1064-2269/93/0002-0196, Heat Transfer Research, vol. 25, No. 2, 1993, pp. 196-203.

Kesarev et al., "Convective Heat Transfer in Turbulized Flow Past a Hemispherical Cavity," Heat Transfer Research, vol. 25, No. 2, 1993, pp. 156-160.

N. Syred et al., "Effect of Surface Curvature on Heat Transfer and Hydrodynamics within a Single Hemispherical Dimple," Paper No. 2000-GT-236, Proceedings of ASME Turboexpo 2000, May 8-11, 2000, Munich Germany, pp. 1-6.

H. K. Moon et al., "Channel Height Effect on Heat Transfer and Friction in a Dimpled Passage," IGTI Turbo Expo, Paper No. 99-GT-163, Indianapolis, pp. 1-8.

C. Carcasi et al., "Heat Transfer and Pressure Drop Evaluation in Thin Wedge-Shaped Trailing Edge," Paper No. GT-2003-38197, IGTI Turbo Expo, Jun. 16-19 Atlanta, Georgia, pp. 111-122.

M. K. Chyu et al., "Convective Heat Transfer of Cubic Fin Arrays in a Narrow Channel," Journal of Turbomachinery , Apr. 1998, vol. 120, pp. 362-367.

N. Zhang et al., "Heat Transfer and Friction Loss Performance in Flow Networks with Multiple Intersections," Experimental Heat Transfer, vol. 6, 1993. pp. 243-257.

V. N. Afanas'Yev et al., "Thermohydraulics of Flow Over Isolated Depressions (Pits, Grooves) in a Smooth Wall," Heat Transfer Research, ISSN 1064-2285/93/0001-0022, vol. 25, No. 1, 1993, pp. 22-56.

V. N. Afanas'-yev et al., "Heat Transfer and Friction on Surfaces Contoured by Spherical Depressions," Heat Transfer Research, vol. 24, No. 1, 1992. pp. 24-105.

V. N. Afanasyev et al., "Turbulent Flow Friction and Heat Transfer Characteristics for Spherical Cavities on a Flat Plate," Experimental Thermal and Fluid Science, 1993, vol. 7, pp. 1-8.

D. E. Metzger et al., "Developing Heat Transfer in Rectangular Ducts with Staggered Arrays of Short Pin Fins", Journal of Heat Transfer, vol. 104, Nov. 1982, pp. 100-706.

K. Takeishi et al., "Heat Transfer Characteristics of a Flow Passage with Long Pin Fins and Improving Heat Transfer Coefficient by Adding Turbulence Promoters on a Endwall," Paper No. 2001-GT-178, IGTI Turbo Expo, New Orleans, pp.

S. Anzai et al., "Effect of the Shape of Turbulence Promoter Ribs on Heat Transfer and Pressure Loss Characteristics", Bulletin of the Gas Turbine Society of Japan, 1992.

* cited by examiner

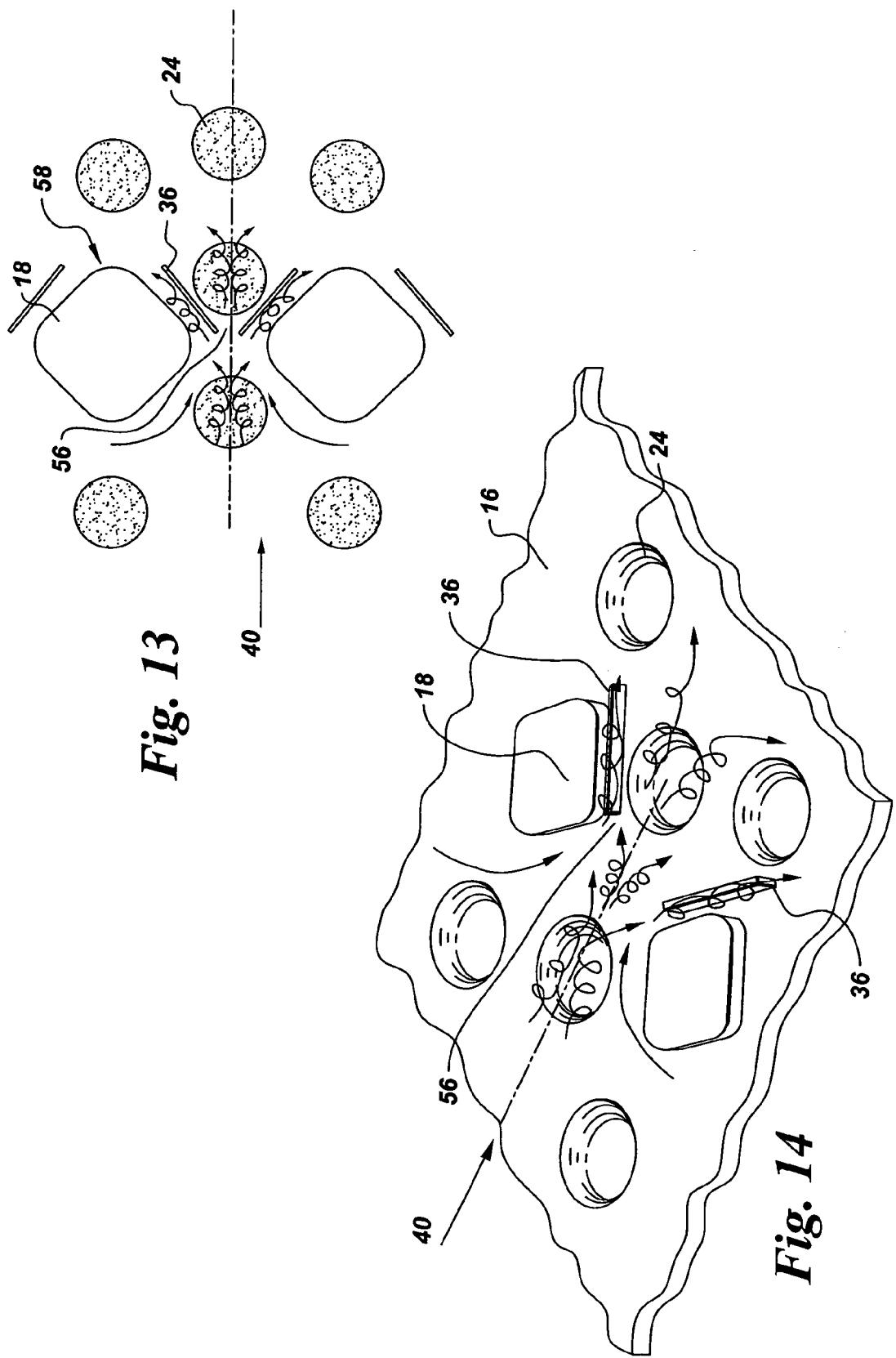

HOT GAS PATH COMPONENT WITH MESH AND DIMPLED COOLING

STATEMENT REGARDING FEDERALLY SPONSORED RESEARCH & DEVELOPMENT

This invention was made with Government support under contract number PRDA VII F33615-02-C-2212 awarded by the DOD. The Government has certain rights in the invention.

CROSS REFERENCE TO RELATED APPLICATIONS

This application is related to commonly assigned U.S. patent application, Ser. No. 10/718,003 R. S. Bunker et al., entitled "Hot Gas Path Component with Mesh and Turbulated Cooling," which is filed concurrently herewith and is hereby incorporated by reference in its entirety.

BACKGROUND

The invention relates generally to hot gas path components for turbine assemblies and, more particularly, to synergistic approaches to cool the hot gas path components.

Exemplary gas turbine engines are used for aircraft or stationary power applications, and engine efficiency is a key design criteria for both applications. The efficiency of gas turbine engines improves with increased temperature of the combustion gas flow. However, a limiting factor in the gas flow temperature is the high temperature capability of the various hot gas path components, such as the turbine stator and rotor airfoils. Stator airfoils are also known as vanes or nozzles, rotor airfoils are also known as blades or buckets.

Various approaches to cooling the hot gas path components have been proposed and implemented to increase the upper operating temperature of the engines. Several of these approaches are reviewed in commonly assigned U.S. Pat. No., 5,690,472, Lee, "Internal Cooling of Turbine Airfoil Wall Using Mesh Cooling Arrangement," which is incorporated herein by reference in its entirety. These cooling techniques typically involve bleeding compressed air off the compressor to serve as a coolant. However, by bypassing the compressed air around the engine's combustion zone to cool the hot gas path components, the overall efficiency of the engine is reduced. Accordingly, it is desirable to increase the cooling effectiveness of the hot gas path components, in order to improve overall engine efficiency.

One beneficial cooling technique is mesh cooling, as described, for example in U.S. Pat. No. 5,690,472, which is cited above, and in U.S. Pat. No. 5,370,499, Lee, "Film Cooling of Turbine Airfoil Wall using Mesh Cooling Hole Arrangement," which is also incorporated by reference herein in its entirety. However, a need for additional improvement in cooling of hot gas path components remains. This need is especially strong for cooling thin airfoil walls and/or regions of limited availability, such as the trailing edges of airfoils. Accordingly, it would be desirable to provide enhanced cooling effectiveness for hot gas components.

BRIEF DESCRIPTION

Briefly, in accordance with one embodiment of the present invention, a component is described. The component includes at least one wall having an inner portion and an outer portion. A number of pins extend between the inner and outer portions of the wall. The pins define a mesh cooling arrangement having a number of flow channels. A number of dimples are located in at least one of the inner and outer portions of the wall.

In accordance with another embodiment, the component further includes a number of turbulators disposed on at least one of the inner and outer portions of the wall.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 13 shows an exemplary cooling flow pattern for a mesh cooling arrangement with dimples and chevron turbulators;

FIG. 14 is a perspective view of FIG. 13; and

DETAILED DESCRIPTION

Figure 1:
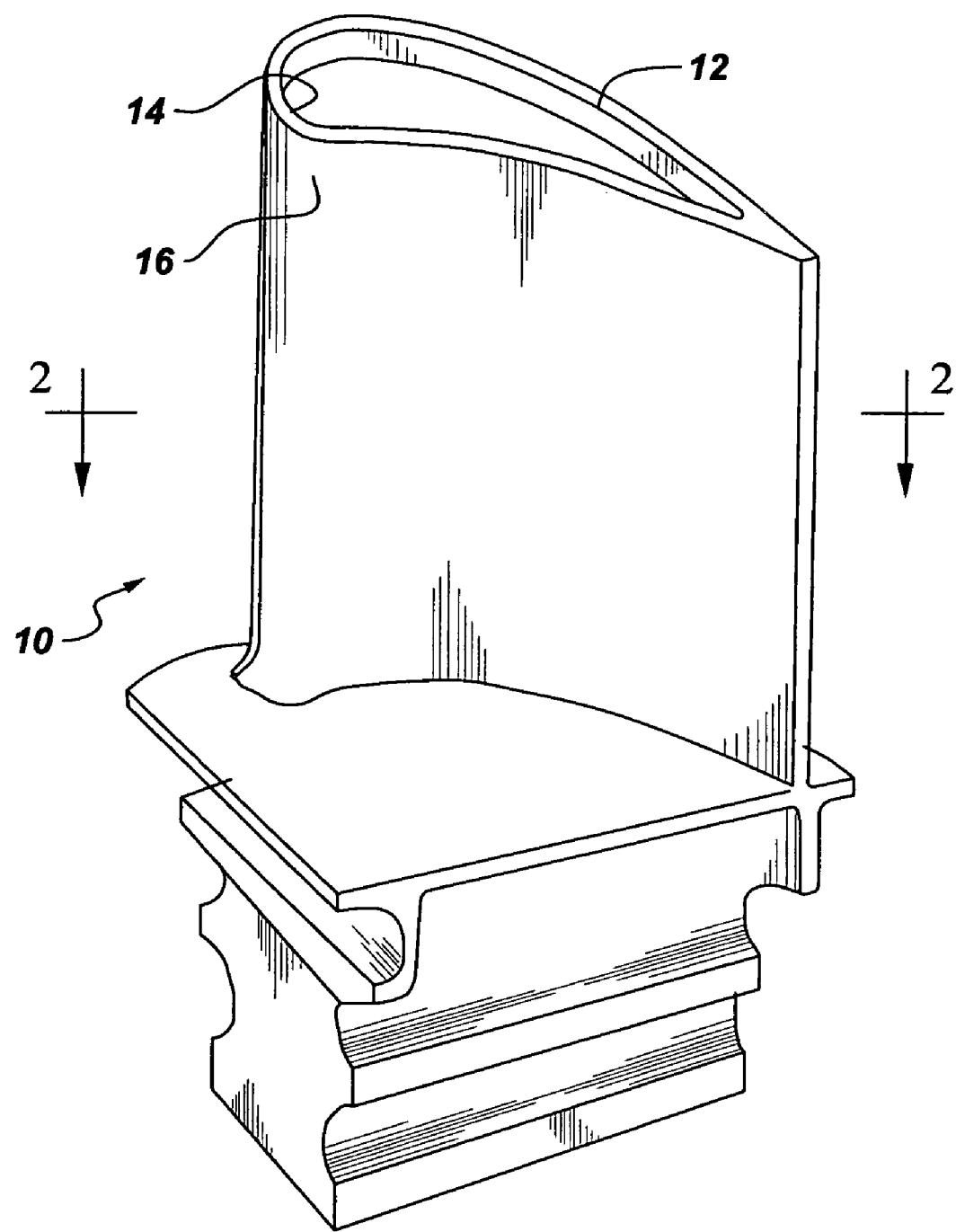
FIG. 1 shows an exemplary hot gas path component with an airfoil.
Figure 2:
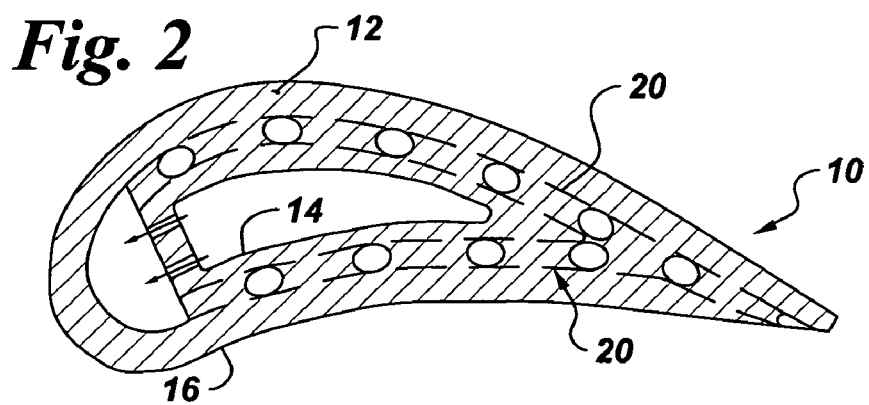
FIG. 2 is a cross-sectional view of the airfoil of FIG. 1, taken along line 2—2 of FIG. 1, and indicating a mesh cooling arrangement.

A component 10 embodiment of the invention is described with reference to FIGS. 1–4. Exemplary components include hot gas path components, such as blades, vanes, end walls, and shrouds. The invention is equally applicable to other portions of the stator and rotor assemblies, as well as to other hot sections such as after-burners. Moreover, the invention applies to various size and application gas turbines, such as aircraft engines and land-based power turbines. Conventional hot gas components are well known, as are mesh cooled hot gas path components. The component 10 shown is purely exemplary, and the invention is not limited to any particular component type. As shown, for example in FIGS. 1 and 2, the component 10 has at least one wall 12 having an inner portion 14 and an outer portion 16. For the exemplary embodiment of FIGS. 1 and 2, the wall 12 is an airfoil wall 12. As shown, for example in FIGS. 3 and 4, the component 10 further includes a number of pins 18 extending between the inner and outer portions 14, 16 of the wall 12. The pins define a mesh cooling arrangement 20 that includes a number of flow channels 22, as shown for example in FIG. 3. Exemplary pin shapes are rounded or sharp, depending on the manufacturing method. Exemplary pin shapes include cylindrical and rounded diamonds. The shape may be selected, in part, to obtain a more directional cooling flow, for example to enhance interaction with the other cooling enhancements, such as dimples and turbulators, which are discussed below. Investment casting produces a rounded pin, whereas sharper corners result from fabrication methods. The component 10 also includes a number of dimples 24 located in at least one of the inner and outer portions 14, 16 of the wall 12, as shown for example in FIGS. 3 and 4. According to three particular embodiments, the dimples are formed in the inner portion 14 of the wall 12, in the outer portion 16 of the wall 12, and in both the inner and outer portions 14, 16 of the wall 12.

Exemplary dimples 24 have a center depth of about 0.010 to about 0.030 inches and a surface diameter of about 0.010 to about 0.12 inches for typical aircraft engine applications. Exemplary dimples have a center depth of about 0.010 to about 0.060 inches and a surface diameter of about 0.010 to about 0.250 inches for typical power turbine applications. The dimples 24 may be formed in a number of shapes. For the exemplary embodiment of FIGS. 3 and 4, the dimples 24 are concave and, more particularly, are hemispherical or hemispherical sections. Another exemplary dimple shape is a cone shape, including both a full or a truncated inverted cone. Beneficially, the dimples 24 set up fluid vortices in the cooling flow, which causes mixing near the component wall 12 (near or on surfaces 14 and 16, and also surfaces of 18), thereby enhancing the heat transfer at the wall 12, as well as on the pin surfaces. In addition, the dimples 24 also increase surface area to help compensate for the area covered by the pins 18. In this manner, the present invention leverages different thermal enhancements in a synergistic approach.

Figure 3:
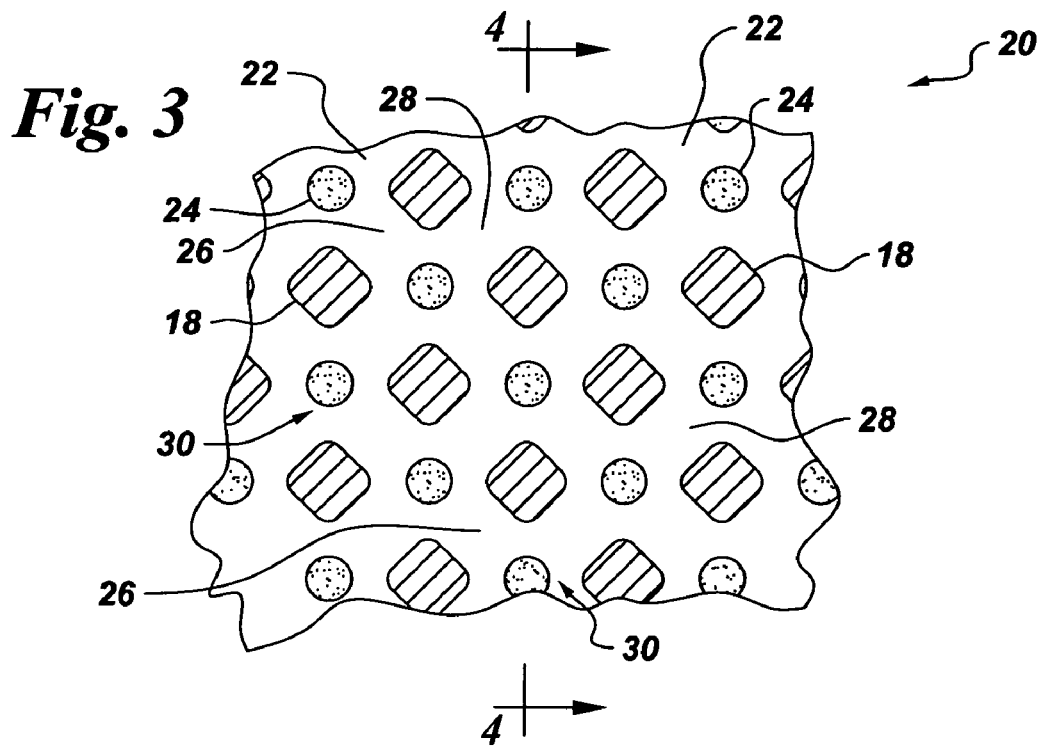
FIG. 3 is an enlarged longitudinal sectional view of an exemplary embodiment of the mesh cooling arrangement of FIG. 2 with a number of dimples arranged at respective intersection points.

For the exemplary arrangement of FIG. 3, the flow channels 22 includes a first set of flow channels 26 substantially parallel to one another and a second set of flow channels 28 extending substantially parallel to one another. As shown, the first and second sets of flow channels 26, 28 intersect one another at a number of intersection points 30 to form the mesh cooling arrangement 20. For the particular arrangement of FIG. 3, the dimples 24 are positioned at the intersection points 30. Beneficially, positioning the dimples 24 at the intersection points 30 within the mesh cooling arrangement 20 enhances both the cooling flow and the heat transfer. The dimples 24 provide a surface relief for expansion of the cooling flow. In addition, the dimples create additional vorticity, further enhancing the heat transfer. Because the vorticity preferentially exits at typically forty-five degree (45°) angles, it does not impact the apex of the solid portions of the mesh, thereby keeping losses low. Although not expressly shown, for smaller sized dimples 24, arrays or rows or other arrangements of dimples 24 may be situated at the intersection points 30.

Figure 5:
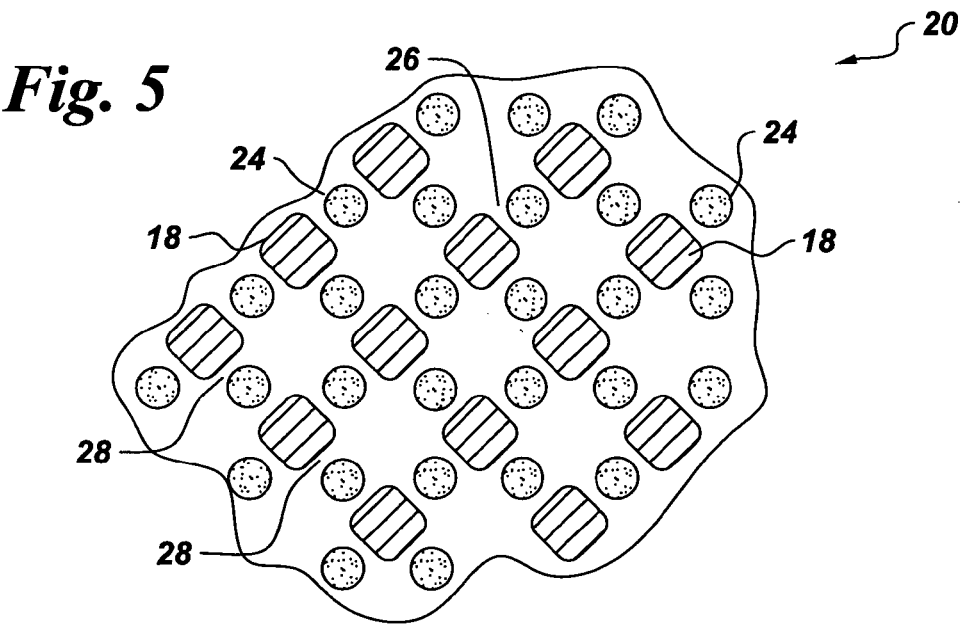
FIG. 5 is an enlarged longitudinal sectional view of another exemplary embodiment of the mesh cooling arrangement of FIG. 2 with a number of dimples arranged between respective pairs of pins.

For the exemplary embodiment of FIG. 5, the dimples 24 are positioned between respective pairs of pins 18. In other words, the dimples 24 are located in the "channel portions" of the mesh cooling arrangement 20, instead of the intersection points 30. Beneficially, positioning the dimples 24 in the channel portions, as shown for example in FIG. 5, enhances post-interaction flow, thereby evening out the creation of vorticity and enhancing heat transfer throughout the mesh.

Figure 4:
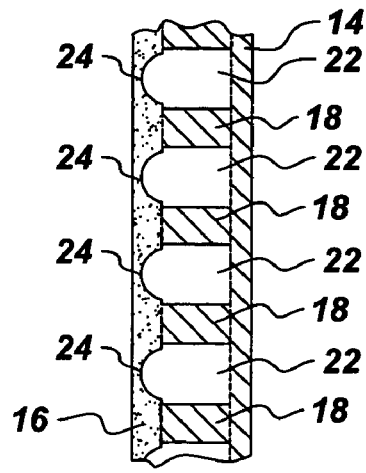
FIG. 4 is a longitudinal sectional view of the mesh cooling arrangement taken along line 4—4 of FIG. 3.
Figure 6:
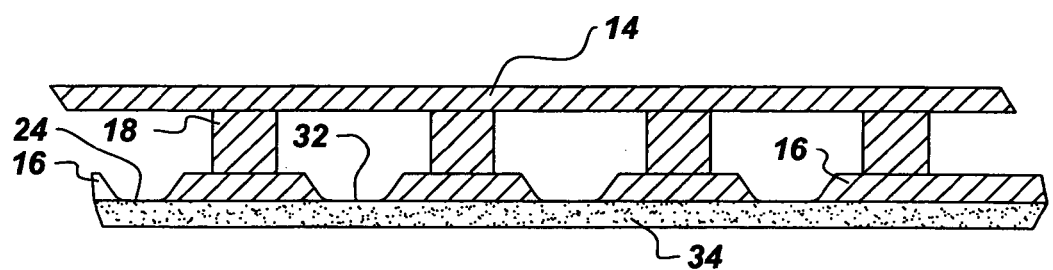
FIG. 6 illustrates an active-passive transpiration and convection embodiment of the mesh cooling and dimple arrangement.

An active-passive transpiration and convection cooling embodiment is described with reference to FIG. 6. For the exemplary embodiment of FIG. 6, the dimples 24 are located in the outer portion 16 of the wall 12, as shown. More particularly, at least one coating 34 is disposed on the outer portion 16 of the wall 12. An exemplary coating 34 is a thermal barrier coating. Still more particularly, at least one of the dimples 24 extends through the outer portion 16 of the wall 12 to form a cooling hole 32, and the coating 34 at least partially covers the cooling hole 32. For the exemplary embodiment of FIG. 6, each of the dimples 24 shown extends through the outer portion 16 of the wall 12 to form respective cooling holes 32, and each of the cooling holes 32 shown is covered by the coating layer 34. Beneficially, by extending through the outer portion 16 of the wall 12, the dimples 24 provide film cooling for the component wall 12. More particularly, the dimples that extend through the outer portion 16 of the wall to form cooling holes 32 provide transpiration cooling, whereas the dimples 24 that do not extend through the outer portion of the wall, as shown for example in FIG. 4, provide convection.

Depending on the desired level of cooling and specific component characteristics, dimples 24 can be formed in either the inner or outer portions 14, 16 of the component wall 12 or in both the inner and outer portions 14, 16 of the wall 12, as noted above. Similarly, the dimples 24 can be formed of varying depth and/or diameter, such that some, all or none of the dimples extend through the respective inner and outer portions 14, 16 of the component wall 12. Where the dimples 24 extend through the respective inner or outer portion 14, 16 of the wall 12, they form cooling holes 32, providing transpiration cooling for the component wall 12, as indicated by the arrows in FIG. 6. Where the dimples 24 do not extend through the outer portion 16 of the wall 12, they provide ventilation to help cool the component wall 12.

A dimpled, turbulated embodiment is described with reference to FIGS. 1, 2, 7 and 8. The component 10 includes at least one wall 12 having an inner portion 14 and an outer portion 16, as discussed above. As shown for example in FIG. 7, the component 10 further includes a number of pins 18 extending between the inner and outer portions 14, 16 of the wall 12. As explained above, the pins define a mesh cooling arrangement 20 with a number of flow channels 22. A number of dimples 24 are located in at least one of the inner and outer portions 14, 16 of the wall 12. The dimples 24 are discussed in detail above with reference to FIGS. 3–6. As shown for example in FIG. 7, a number of turbulators 36 are disposed on at least one of the inner and outer portions 14, 16 of the wall 12. Exemplary turbulators 36 provide local flow channel blockage in a range of about ten percent (10%) to about fifty percent (50%). For the exemplary embodiment of FIG. 8, the turbulators 36 are disposed on the outer portion 16 of the component wall 12. However, as with the dimples 24, the turbulators 36 may be formed on the inner portion 14, on the outer portion 16, or on both the inner and outer portions 14, 16 of the component wall 12, depending on the desired cooling arrangement and the particular component characteristics and requirements.

Figure 7:
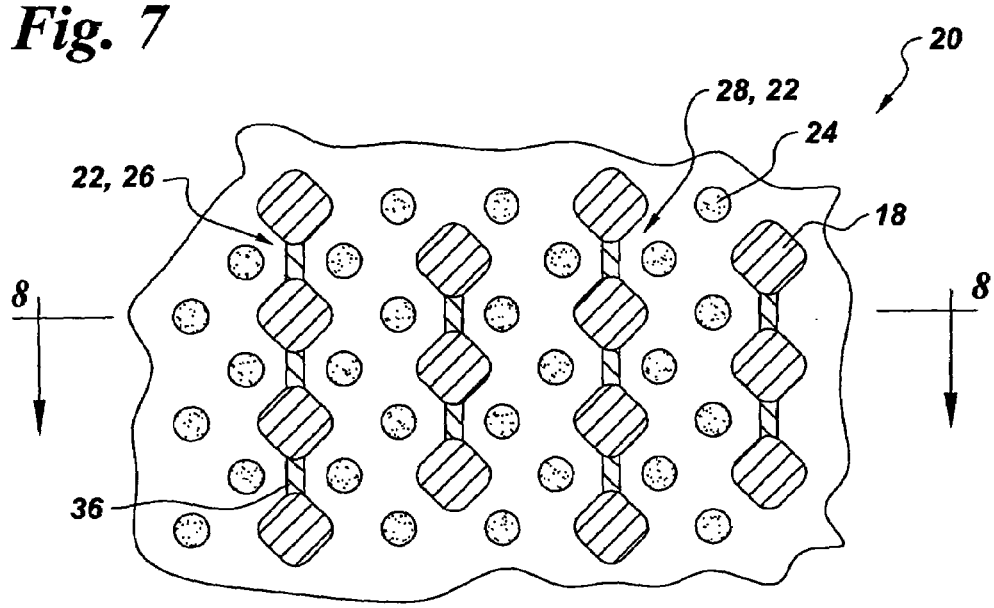
FIG. 7 illustrates an exemplary mesh cooling arrangement with dimples and transverse turbulators.
Figure 8:
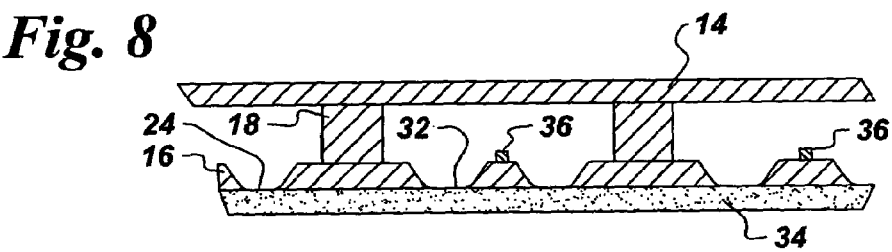
FIG. 8 is a longitudinal sectional view of the mesh cooling arrangement taken along line 8—8 of FIG. 7.
Figure 9:
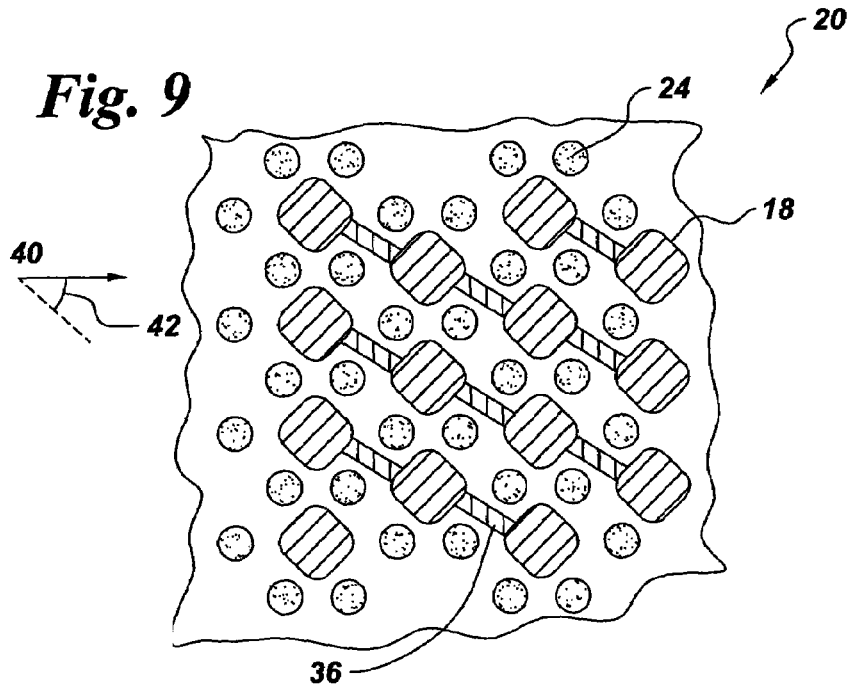
FIG. 9 depicts an exemplary mesh cooling arrangement with dimples and angled turbulators.
Figure 10:
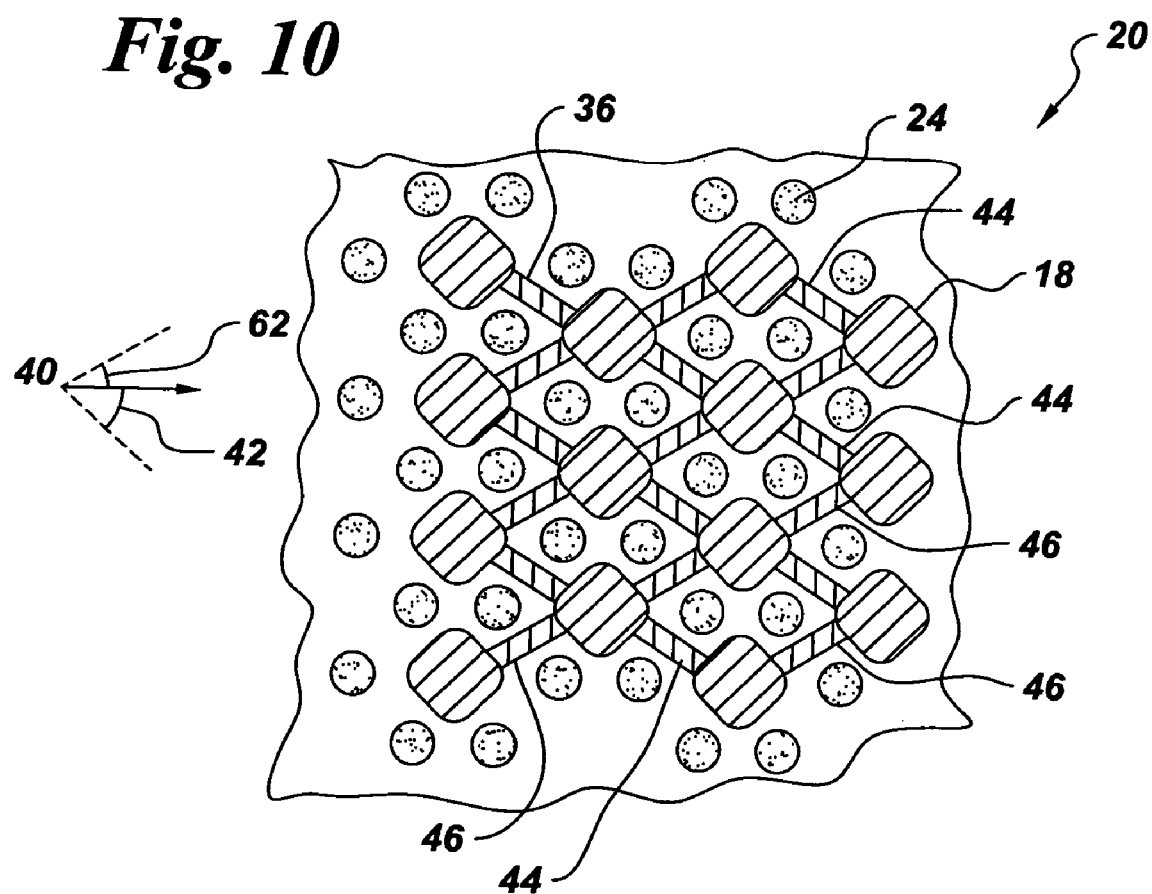
FIG. 10 illustrates an exemplary mesh cooling arrangement with dimples and alternating segmented turbulators.

The turbulators 36 may be arranged in a number of configurations, examples of which are shown in FIGS. 7, 9 and 10. For the exemplary embodiment of FIG. 7, the turbulators 36 are "transverse" turbulators, which extend between respective pairs of pins 18 in a direction transverse 38 to a cooling flow 40. For the exemplary embodiment of FIG. 9, the turbulators 36 are "angled" turbulators, which extend between respective pairs of pins 18 and are oriented at an angle 42 relative to a cooling flow 40. The angle 42 shown in FIG. 9 is exemplary. FIG. 10 depicts an exemplary arrangement of "alternating segmented" turbulators, for which a first subset 44 of turbulators 36 extend between respective pairs of pins 18 and are oriented at an angle 42 relative to a cooling flow 40. A second subset 46 of turbulators 36 extend between respective pairs of pins 18 and are oriented at a second angle 62 relative to the cooling flow 40. For the exemplary embodiment of FIG. 10, the first and second angles 42, 62 intersect and, more particularly, differ by about ninety degrees (90°). By "intersecting angles," it is meant that the turbulators 36 in the first subset 44 are not parallel to those in the second subset 46. In other words, the respective turbulators in the first subset 44 are oriented relative to the turbulators in the second subset 46 such that they would intersect with their counterparts in the second subset 46 if they were long enough to do so. Beneficially, the turbulators 36 further enhance the heat transfer in a synergistic manner, when arranged in the angled or alternating segmented configurations of FIGS. 9 and 10. These configurations cause near wall flows to be directed onto the pins 18, as well as interacting with the dimpled flow vortices naturally in the angled flows from one pin row to the next. For example, the configuration of FIG. 10 provides synergy of mechanisms for the flow fields as the angled vortices expelled from the dimples react with the turbulators. In this manner, overall heat transfer enhancements on the order of about three (3) may be obtained.

By combining different cooling elements (namely mesh cooling, dimples, and turbulators), synergies are created, which enhance heat transfer up to a factor of about three (3), depending on the component type, location, materials, and specific cooling arrangement. This improved heat transfer, in turn, allows weight reduction for the component 10 by lowering the pin density required to achieve similar heat transfer, due to the enhancements provided by the dimples 24 and turbulators 36. In addition, the turbulators 36 may also provide some level of increased strength. Also, the use of multiple cooling elements provides greater flexibility for adjusting local cooling. The use of multiple cooling elements also provides more balanced pressure losses.

Figure 11:
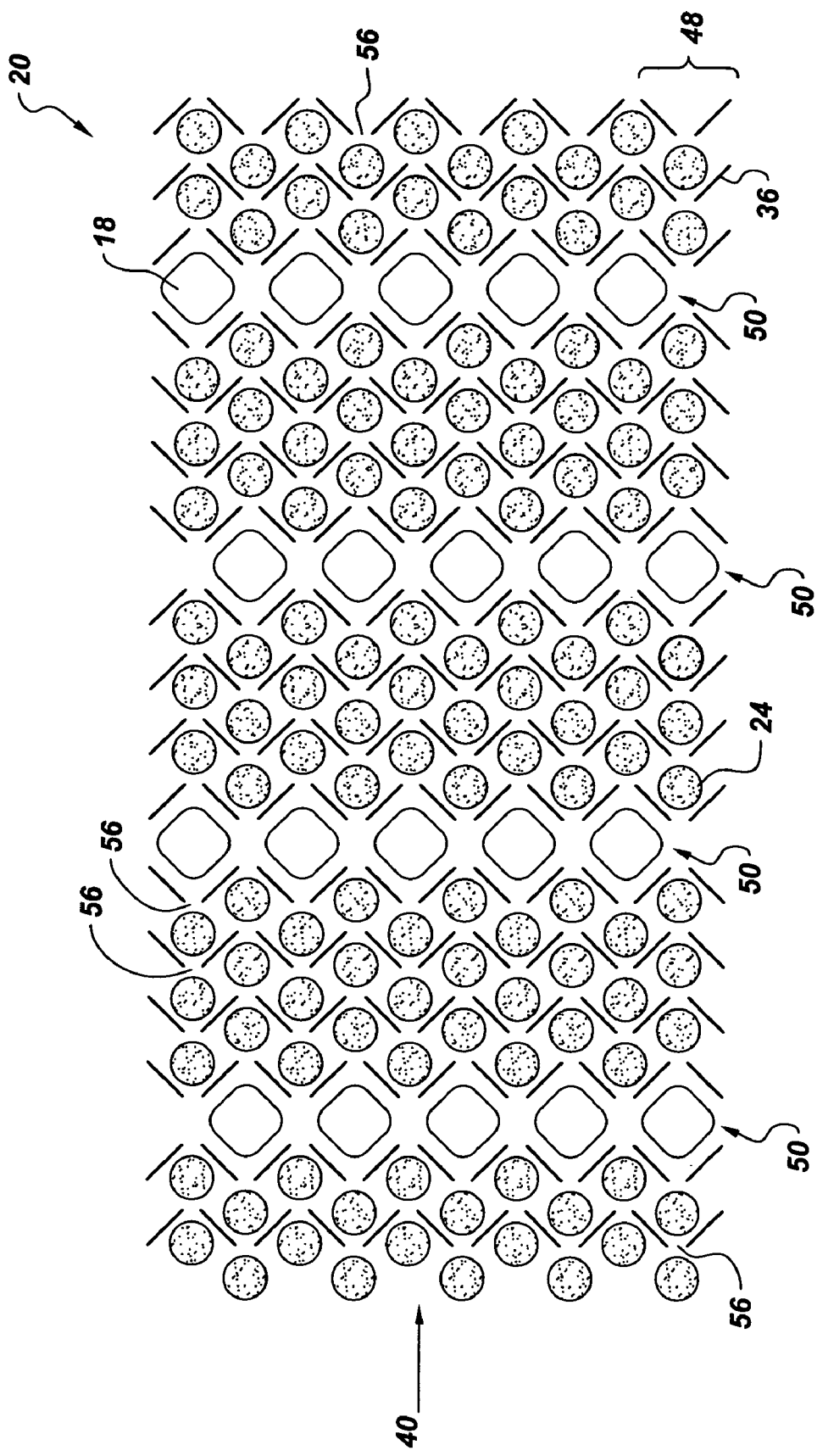
FIG. 11 illustrates an exemplary mesh cooling arrangement with dimples and chevron turbulators.
Figure 12:
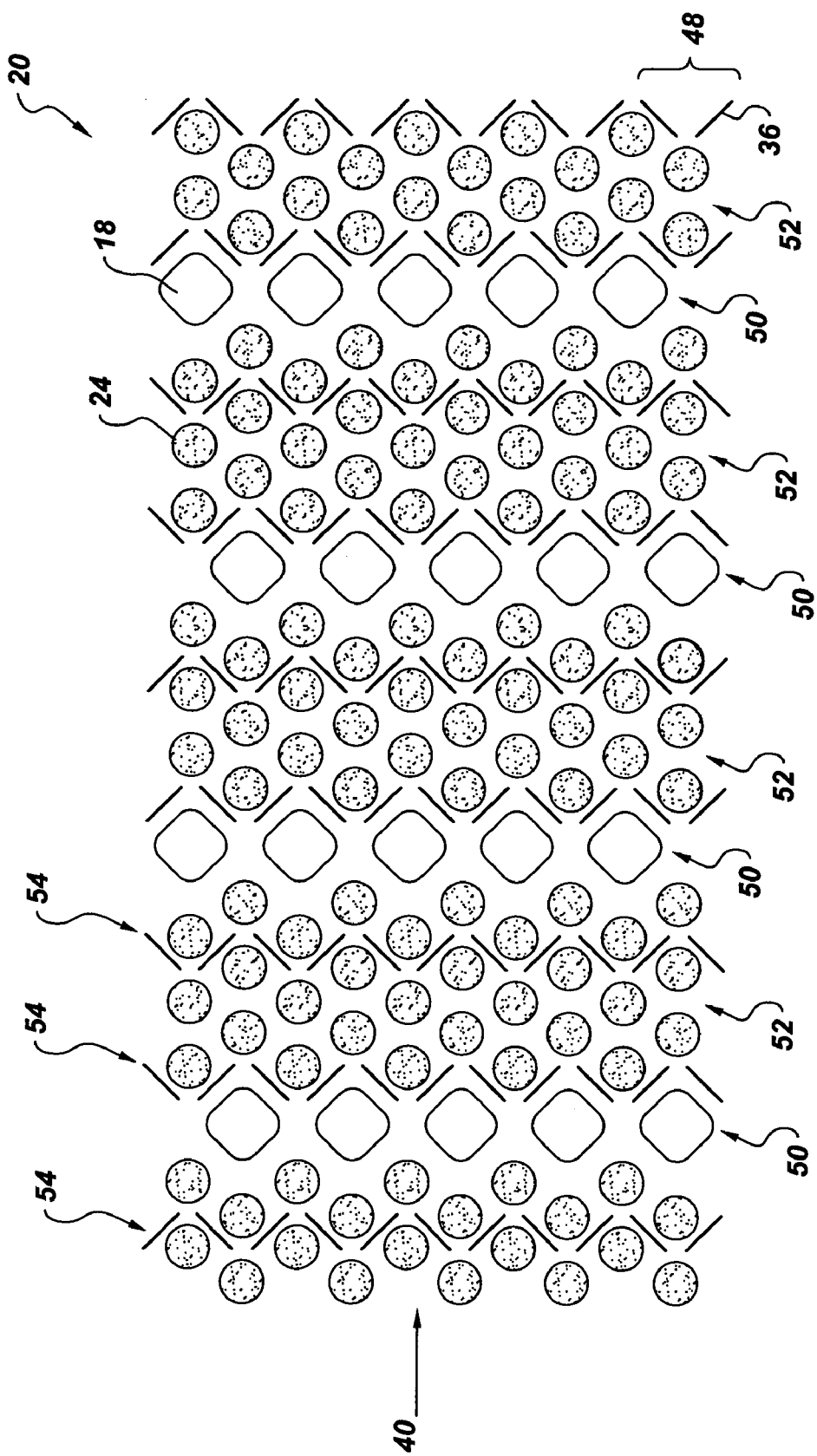
FIG. 12 illustrates another exemplary mesh cooling arrangement with dimples and chevron turbulators, with a less dense segmented chevron pattern than that of FIG. 11.

A chevron turbulator embodiment is described with reference to FIGS. 11 and 12. As shown for example in FIGS. 11 and 12, respective pairs of turbulators 36 form chevron turbulators 48 on the respective one of the inner and outer portions 14, 16 of the component wall 12. For the particular embodiments of FIGS. 11 and 12, the chevron turbulators 48 are segmented chevron turbulators. Segmentation corresponds to an open apex 56, as shown in FIGS. 11 and 12. Beneficially, segmentation, by providing an open apex 56, generates more effective fluid vortices. Convection along the angled direction of the turbulator segments 36 induces a kind of secondary vortical motion that is highly effective in thermal enhancements.

FIGS. 13 and 14 illustrate several of the benefits of the segmented chevron turbulator arrangements of FIGS. 11 and 12. As indicated in FIGS. 13 and 14, the cooling flow is accelerated through the gaps between neighboring pins 18. This accelerated cooling flow then interacts with the open apex portion 56 of the chevron turbulator 48 to generate mixing and convecting vortices, as shown for example in FIG. 14. Further, the chevron turbulators 48 enhance the interaction of the cooling flow with the downstream surface areas 58 of the pins 18, as indicated in FIG. 13. The vortices also interact directly with the local dimple flow fields to induce associated stronger vortices from these features. As a result of these synergies, the heat transfer is enhanced.

For the exemplary embodiments illustrated in FIGS. 11 and 12, the pins 18 are arranged in a number of columns 50, and each of a number of subsets 52 of dimples 24 are disposed between respective ones of the columns 50 of pins 18, as shown. Similarly, each of a number of subsets 54 of chevron turbulators 48 are also disposed between respective ones of the columns 50 of pins 18, as is also shown in FIGS. 11 and 12. According to three particular embodiments, the dimples 24 and chevron turbulators 48 are formed on the inner portion 14 of the component wall 12, on the outer portion 16 of the wall 12, and on both the inner and outer portions 14, 16 of the component wall 12, respectively.

For the exemplary embodiment of FIG. 11, the dimples 24 and chevron turbulators 48 are alternately disposed on the respective one of the inner and outer portions 14, 16 of the component wall 12, as shown. FIG. 12 shows a less dense segmented chevron pattern. For the exemplary embodiment of FIG. 12, at least two dimples 24 are positioned between a respective pair of chevron turbulators 48, as shown.

Both FIGS. 11 and 12 show chevron turbulators 48 with apexes 56 oriented upstream relative to the cooling flow 40. Generally, orienting the apex of the chevron to point upstream enhances heat transfer. However, depending on the particular mesh cooling and dimple arrangement, it may also be desirable for some of the chevron turbulators 48 to have apexes 56 oriented downstream relative to the cooling flow 40. According to a particular embodiment, each of the chevron turbulators 48 within at least one of the subsets 54 of chevron turbulators 48 has an apex 56 oriented upstream relative to the cooling flow 40. According to another embodiment (not expressly shown), each of the chevron turbulators 48 within at least one of the subsets 54 of chevron turbulators 48 has an apex 56 oriented downstream relative to the cooling flow 40.

Beneficially, the dimpled, segmented chevron turbulator embodiments of FIGS. 11 and 12 provide high thermal effectiveness for in-wall cooling. Moreover, the unique fluid-surface interactions created by these arrangements generate bulk mixing and vortical motion within severely confined space limitations, for thermal enhancements. Also, the combination of cooling elements (namely, mesh cooling, turbulators and dimples) provides flexibility for achievement of a range of conditions, both locally and globally. In addition, this improved thermal effectiveness permits the use of fewer pins 18, thereby reducing the component weight, which is highly desirable.

Figure 15:
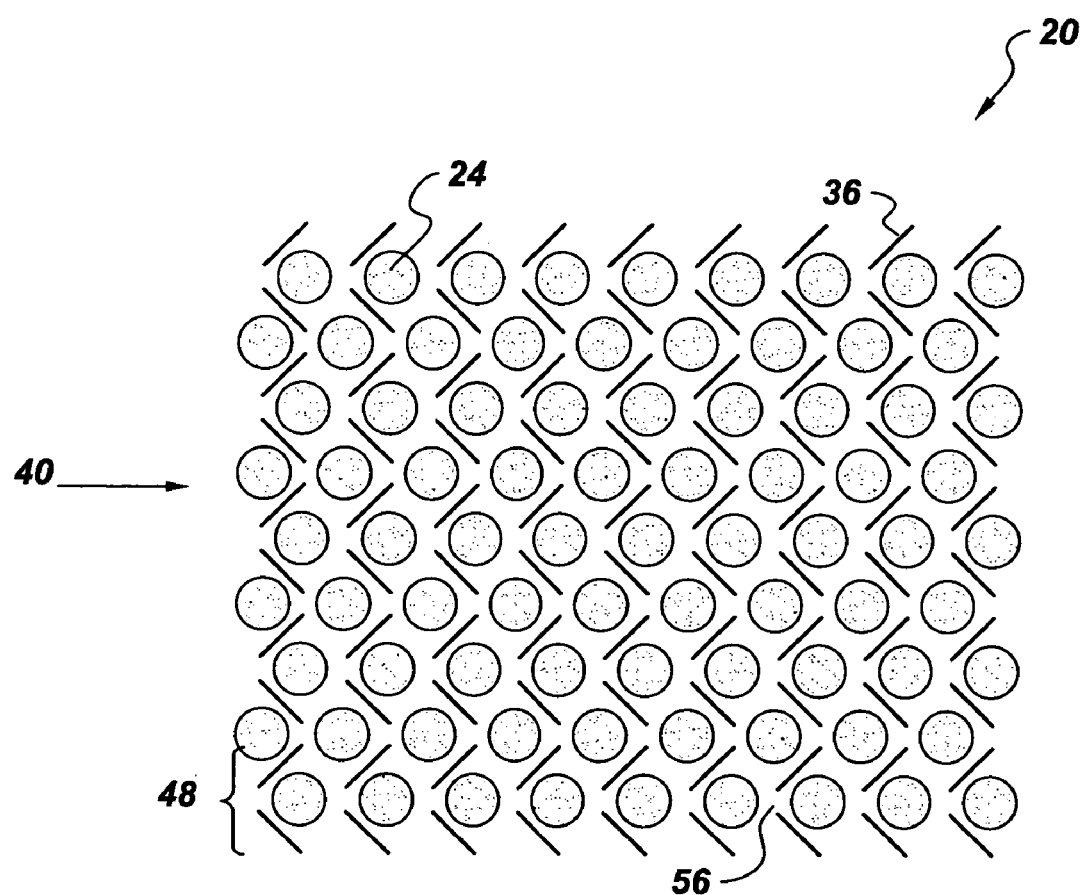
FIG. 15 illustrates another cooling arrangement of dimples and segmented chevron turbulators.

Another component embodiment is described with reference to FIGS. 1 and 15. As shown in FIG. 1, the component 10 has at least one wall 12 with an inner portion 14 and an outer portion 16. A number of dimples 24 are located in at least one of the inner and outer portions 14, 16 of the wall, as shown for example in FIG. 15. A number of turbulators 36 are disposed on at least one of the inner and outer portions 14, 16 of the component wall 12, as shown for example in FIG. 15. For the exemplary embodiment of FIG. 15, respective pairs of turbulators 36 form chevron turbulators 48 on the respective one of the inner and outer portions 14, 16 of the wall 12. More particularly, the chevron turbulators 48 are segmented (or open), as shown. According to a particular embodiment, the dimples 24 and chevron turbulators 48 are formed on both of the inner and outer portions 14, 16 of the component wall 12.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A component comprising:
   at least one wall having an inner portion and an outer portion;
   a plurality of pins extending between said inner and outer portions of said wall, wherein said pins define a mesh cooling arrangement comprising a plurality of flow channels;
   a plurality of dimples located in said outer portion of said wall; and
   at least one coating on said outer portion of said wall, wherein at least one of said dimples extends through said outer portion of said wall to form a cooling hole, and wherein said coating at least partially covers said cooling hole.

2. The component of claim 1,
   wherein said flow channels comprise a first set of flow channels substantially parallel to one another and a second set of flow channels extending substantially parallel to one another,
   wherein said first and second sets of flow channels intersect one another at a plurality of intersection points to form said mesh cooling arrangement, and
   wherein at least one of said dimples is positioned at a respective one of the intersection points.

3. The component of claim 2, wherein a majority of said dimples are positioned at respective intersection points.

4. The component of claim 1, wherein at least one of said dimples is positioned between a respective pair of said pins.

5. The component of claim 1, wherein a majority of said dimples are positioned between respective pairs of said pins.

6. The component of claim 1, wherein said dimples are located in both of said inner and outer portions of said wall.

7. The component of claim 1, further comprising a plurality of dimples located in said inner portion of said wall.

8. The component of claim 7, wherein at least one of said dimples extends through said inner portion of said wall to form a cooling hole.

9. The component of claim 8, wherein each of said dimples extends through the respective one of said inner and outer portions of said wall to form a plurality of cooling holes.

10. The component of claim 7, wherein none of said dimples extend through said inner portion of said wall.

11. The component of claim 1, wherein said coating comprises a thermal barrier coating.

12. The component of claim 1, wherein each of said dimples has a center depth of about 0.010 to about 0.030 inches and a surface diameter of about 0.010 to about 0.12 inches.

13. The component of claim 1, wherein each of said dimples is concave.

14. The component of claim 13, wherein each of said dimples is hemispherical.

15. The component of claim 1, wherein each of said dimples is cone shaped.

16. The component of claim 1, wherein at least one of said dimples does not extend through said outer portion of said wall.

17. A hot gas path component comprising:
    at least one wall having an inner portion and an outer portion;
    a plurality of pins extending between said inner and outer portions of said wall, wherein said pins define a mesh cooling arrangement comprising a plurality of flow channels, wherein said flow channels comprise a first set of flow channels substantially parallel to one another and a second set of flow channels extending substantially parallel to one another, and wherein said first and second sets of flow channels intersect one another at a plurality of intersection points to form said mesh cooling arrangement;
    a plurality of dimples located in at least one of said inner and outer portions of said wall, wherein at least one of said dimples is positioned at a respective one of the intersection; and
    at least one coating on said outer portion of said wall, wherein at least one of said dimples extends through said outer portion of said wall to form a cooling hole, and wherein said coating at least partially covers said cooling hole.

18. The hot gas path component of claim 17, wherein a majority of said dimples are positioned at respective intersection points.

19. The hot gas path component of claim 17, wherein at least one of said dimples is positioned between a respective pair of said pins.

20. The component of claim 17, wherein said coating comprises a thermal barrier coating.

21. A component comprising:
    at least one wall having an inner portion and an outer portion;
    a plurality of pins extending between said inner and outer portions of said wall, wherein said pins define a mesh cooling arrangement comprising a plurality of flow channels;
    a plurality of dimples located in at least one of said inner and outer portions of said wall; and
    a plurality of turbulators disposed on at least one of said inner and outer portions of said wall,
    wherein a first subset of said turbulators extend between respective pairs of said pins and are oriented at a first angle relative to a cooling flow, wherein a second subset of said turbulators extend between respective pairs of said pins and are oriented at a second angle relative to the cooling flow, and wherein the first and second angles intersect.

22. The component of claim 21, wherein respective pairs of turbulators form chevron turbulators on the respective one of said inner and outer portions of said wall.

23. The component of claim 22, wherein said dimples and said chevron turbulators are formed on only one of said inner and outer portions of said wall.

24. The component of claim 22, wherein said dimples and said chevron turbulators are formed on both of said inner and outer portions of said wall.

25. A component comprising:
    at least one wall having an inner portion and an outer portion;
    a plurality of pins extending between said inner and outer portions of said wall, wherein said pins define a mesh cooling arrangement comprising a plurality of flow channels;
    a plurality of dimples located in at least one of said inner and outer portions of said wall; and
    a plurality of turbulators disposed on at least one of said inner and outer portions of said wall,
    wherein respective pairs of turbulators form chevron turbulators on the respective one of said inner and outer portions of said wall, wherein said pins are arranged in a plurality of columns, wherein each of a plurality of subsets of said dimples are disposed between respective ones of said columns of said pins, and wherein each of a plurality of subsets of said chevron turbulators are also disposed between respective ones of said columns of said pins.

26. The component of claim 25, wherein said dimples and said chevron turbulators are alternately disposed on the respective one of said inner and outer portions of said wall.

27. The component of claim 25, wherein at least two of said dimples are positioned between a respective pair of said chevron turbulators.

28. The component of claim 25, wherein each of said chevron turbulators within at least one of said subsets of said chevron turbulators has an apex oriented downstream relative to a cooling flow.

29. The component of claim 25, wherein each of said chevron turbulators within at least one of said subsets of said chevron turbulators has an apex oriented upstream relative to a cooling flow.

30. A component comprising:

at least one wall having an inner portion and an outer portion;

a plurality of pins extending between said inner and outer portions of said wall, wherein said pins define a mesh cooling arrangement comprising a plurality of flow channels;

a plurality of dimples located in at least one of said inner and outer portions of said wall; and a plurality of turbulators disposed on at least one of said inner and outer portions of said wall, wherein respective pairs of turbulators form chevron turbulators on the respective one of said inner and outer portions of said wall and wherein at least one of said chevron turbulators is segmented.

* * * * *